United States Patent [19]

Tol

[11] 4,428,053
[45] Jan. 24, 1984

[54] ADAPTIVE COMPASS AND NORTH STABILIZATION DRIVE SYSTEM

[75] Inventor: John M. Tol, Sudbury, Mass.

[73] Assignee: Raytheon Company, Lexington, Mass.

[21] Appl. No.: 278,795

[22] Filed: Jun. 29, 1981

[51] Int. Cl.³ .......................................... H03K 13/02
[52] U.S. Cl. ............................ 364/457; 340/347 SY; 33/363 R; 318/654
[58] Field of Search ............ 364/457, 571; 33/317 R, 33/319, 326, 363 R; 340/347 SY, 24, 28 NA; 318/654, 661

[56] References Cited

U.S. PATENT DOCUMENTS

| | | | |
|---|---|---|---|
| 3,363,244 | 1/1968 | Milroy | 340/347 SY |
| 3,573,801 | 4/1971 | Cohen et al. | 340/347 SY |
| 3,618,073 | 11/1971 | Domchick | 340/347 SY |
| 3,787,835 | 1/1974 | Mathiesen | 340/347 SY |
| 3,914,759 | 10/1975 | Herchenroeder | 340/347 SY |
| 3,918,044 | 11/1975 | Alpatoff et al. | 340/347 SY |
| 4,010,463 | 3/1977 | Kay | 340/347 SY |
| 4,067,007 | 1/1978 | Bryden | 340/347 SY |
| 4,340,881 | 7/1982 | Stack et al. | 340/347 SY |

*Primary Examiner*—Gary Chin
*Attorney, Agent, or Firm*—Herbert W. Arnold; Joseph D. Pannone

[57] ABSTRACT

This system accepts compass outputs from a wide variety of compass output devices such as stepper and synchro devices having different coupling ratios, supply voltages and carrier frequencies. The system then, as part of a PPI radar system, electronically converts these compass outputs without the usual intermediary electromechanical devices into real-time analog reference signals properly phased with respect to the radar timing to provide an electronically stabilized PPI. This is achieved by comparing the points of equal amplitude of any two phases of gyro compass synchro output signals and using these major transition points to provide a digital code indicating the angular position of the gyro output shaft; a microprocessor then transforms the code, by comparison with a previously stored position code into coded position change signals which are then used to change a stored angular value, representing the course of the ship. These coded angular data are converted to analog sweep reference outputs applied to the deflection circuit of the display to provide a stabilized and oriented PPI display. Moreover, in cases where synchro coupling ratios are used, resulting in smaller angular changes in the synchro shaft position for a given change in course, minor transition points can be inserted between the major transition points to provide the correct step changes in the orientation of the PPI.

19 Claims, 14 Drawing Figures

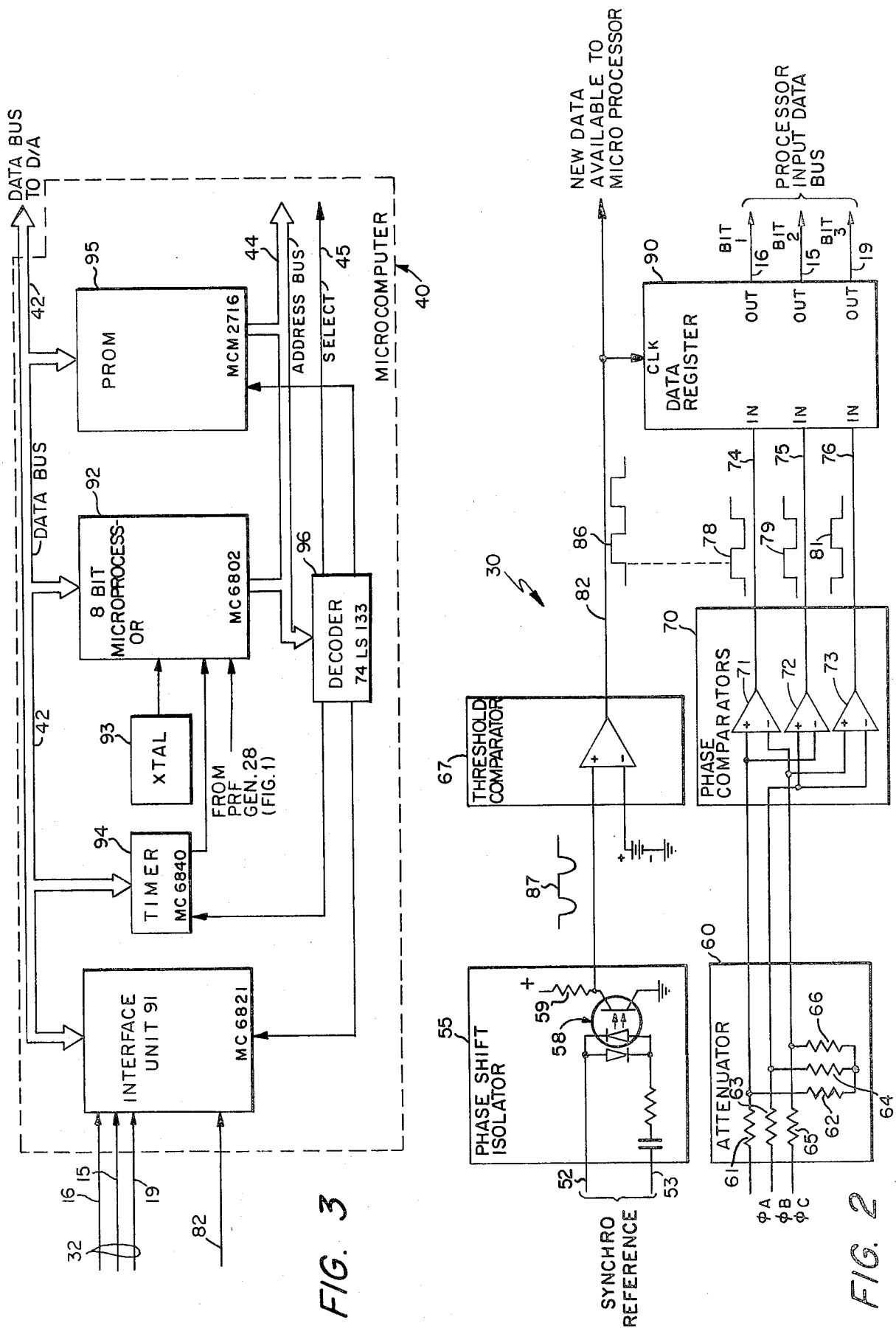

ADAPTIVE COMPASS AND NORTH STABILIZATION DRIVE SYSTEM

BACKGROUND OF THE INVENTION

1. Field of the Invention

The invention relates to a radar system adapted for shipboard or airborne operation in which a gyro compass produces signals which are used for providing stabilization of the radar display so that the radar presentation upon the display screen does not rotate along with course changes of the ship, and for providing course related outputs such as visual readout of true bearing.

2. Description of the Prior Art

Shipboard radar systems customarily include a gyro compass which produces incremental heading information to the radar system for rotation of a true bearing scale, for providing north stabilization of the radar display, and for providing true motion correction. The most common gyro compass systems have either stepper motor or synchro-types of outputs. In the case of a stepper motor, three pole sets are commonly used with either 10' or 20' bearing change per output step. Pulse amplitudes of 35, 50 and 70 volts are normally employed. Synchro outputs, which are ordinarily three-phased, produce analog outputs representing either 1° or 2° of bearing per 360° of shaft rotation. Somewhat less common are synchro outputs representing 10° of bearing per 360° of shaft rotation. The rotor is driven from a supply frequency of either 50, 60 or 400 Hz with commonly used voltages of 50, 60, 62, 115, 125 and 150 volts. The stator voltages are known to range between 20 and 90 volts with 20, 24, 57, 68, 82 and 90 volts being used in the most common commercially available units.

In past practice, the gyro compass course inputs were used to drive expensive mechanical devices, such as stepping motors, resolvers, and sine-cosine potentiometers to generate a stabilized and oriented PPI display and to rotate a true bearing scale.

Common electronic circuitry to drive the mechanical linkage from a DC stepper or 360:1 or 180:1 synchro-type gyro compass input, adaptable to a wide range of rotor and stator voltages have lately become available, avoiding the need for a new design for each different configuration. An example of one version of such a system is shown in U.S. Pat. No. 4,107,007, of J. E. Bryden, filed on Jan. 5, 1976, issued on Jan. 3, 1978, and assigned to the present assignee. However, compass systems with a synchro coupling, such, for example, that the required incremental step corresponds to a precision higher than a one sixth division of a full synchro revolution, usually requires a special mechanical solution such as remote duplication of the synchro shaft rotation to drive a version of a well-known optical shaft encoder and to acquire the desired subdivision. Such duplication adds to expense and system complexity.

Shipboard gyro compass output systems are usually susceptable to signal distortions such as high amplitude common mode transients and to uncertainties in transitions on the high level phase output gyro signal lines, resulting in display jitter, erroneous bearing read outs and, therefore, the need for frequent alignments.

SUMMARY OF THE INVENTION

Accordingly, it is an object of the present invention to provide a compass drive system adaptable for use with either a DC or AC stepper-type or synchro-type gyro compass output, including situations requiring an incremental step which corresponds to a higher precision than six divisions of a full synchro revolution and to control the orientation and stabilization of the associated PPI display.

Furthermore, it is an object of the invention to provide an adaptive compass drive to extract correct shaft rotational information from the gyro compass output devices with negligeable loading of the compass output lines and under adverse conditions of electrical disturbances.

It is another object to provide an improved compass drive system having a general capability to accept the electrical input from any incremental positioning device that sets the state, or provides the amplitude, of two or more output lines as a function of the angular or linear position of the device and to permit the highest possible speed of the input drive, commensurate with the carrier frequency used in AC systems.

It is yet another object of the invention to provide an improved compass drive system which utilizes digital directional codes in the orientation and stabilization of the associated PPI display without the need for presently used expensive mechanical devices.

These as well as other objects of the invention are achieved by a radar system in which gyro output signals of the incremental positioning devices of the synchro- or stepper-type, containing shaft position information in the relative amplitudes of the phases of the output signals at any given moment of time, are preconditioned, or normalized by phase comparator means. The gyro output signals thus provide comparator output signals which contain a normallized signal which is strobed into an output register, for AC inputs near the peak of any selected carrier half cycle, for DC outputs, whenever a change occurs, thus providing a digital code at the output of said register. The output register feeds the conditioned input signals to a microprocessor which retrieves from coded present and previous values a coded change signal representing a single or multiple step change in gyro shaft position in either direction. This output is used to update a stored angular value, representing the ship's present course. A signal containing the rotation angle is fed into a D to A converter properly phased with respect to the radar timing sequence to provide analog sweep reference voltages adapted to generate a stabilized and oriented PPI display without the usual mechanical resolvers and driving motors.

More particularly, the adaptive compass drive system of the invention accepts compass outputs from a wide variety of compass stepper or synchro output devices. The phase comparator means accepts the sinusoidal carrier type envelopes of these compass synchro output devices, preferably in the form of three individual phase signals with sinusoidal envelopes, and by comparison determines points of equal carrier amplitude between any two phases. The comparators thus divide a 360° synchro shaft revolution into six divisions and provide square wave output waveforms of positive and negative half cycles for a given carrier period and shaft position. A step change in the position of the compass synchro output device causes a transition in the state of the comparator output waveforms. It should be understood that for DC stepper devices, the state of the input phase lines is a DC level with respect to "zero" level. The output of the comparators, which now compare the input signals to a DC reference, are DC levels, strobed into the output register whenever a change occurs. The carrier frequency of the synchro waveforms is removed by strobing the square waves into an output register near the peak of the selected carrier half cycle, and in this manner these gyro compass output signals are considered to have been conditioned. The register now contains the major transitions up or down of the output of the phase comparator means. This information in the output register is updated once per carrier cycle for gyro compass synchro outputs. A microcomputer retrieves from the digital coded values stored in the output register and the previous digital values, stored in the computer, a coded change signal representing an incremental change in angular position of the gyro shaft, and modifies a stored angular value. The angular data, representing the PPI rotation angle, is transferred to a digital analog conversion means which, in conjunction with analog voltages representing the current antenna shaft position data, generate real time output signals, properly phased with respect to the radar timing sequence, in the format of analog reference voltages to provide the stabilized and oriented PPI display usually with auxiliary controlled information such as operator controlled electronic bearing lines, true or relative bearing marks, north reference line and the like. Accordingly, any time the gyro shaft position passes a transition point, such as from up steps or down steps, the processor corrects the accumulated position count being used to update the digital to analog converter input signals, thereby correcting the orientation of the PPI.

BRIEF DESCRIPTION OF THE DRAWINGS

Other and further objects and advantages of the invention will become apparent as the description thereof progresses, reference being had to the accompanying drawings wherein:

FIGS. 2, 3 and 4 taken together are a block schematic diagram of the adaptive compass system shown in FIG. 1;

DESCRIPTION OF THE PREFERRED EMBODIMENT

Figure 9:
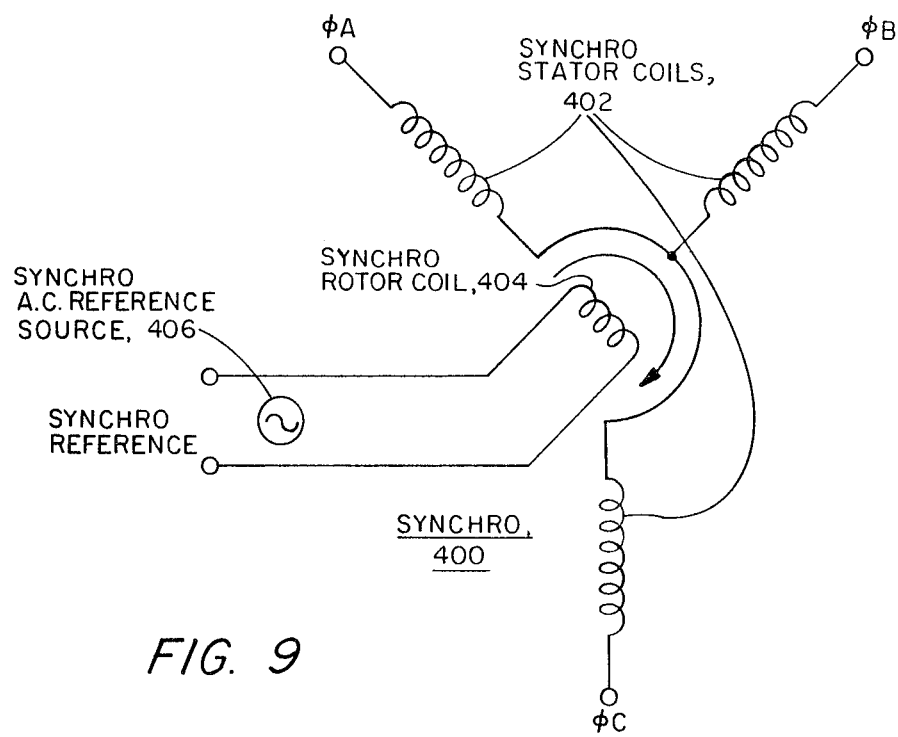
FIG. 9 is a schematic diagram of a synchro-type gyro compass.
Figures 10, 10A:
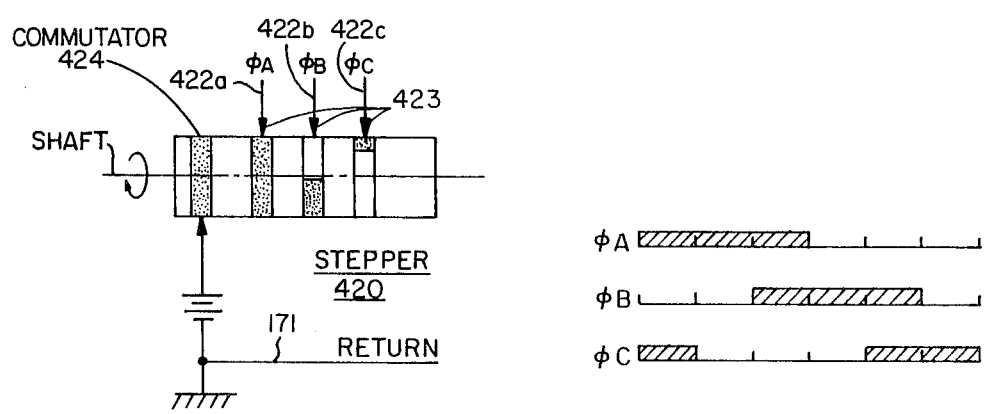
FIG. 10 is a schematic diagram of a stepper-type gyro compass.
FIG. 10a shows the polarity of the output waveforms of the gyro compass of FIG. 10.

Referring briefly first to FIGS. 9 and 10, there is shown respectively a synchro-type gyro compass output device 400 and a stepper-type gyro compass output device 420. In the synchro-type gyro compass 400 shown in FIG. 9, there are provided three synchro stator coils 402 positioned electrically at 120° intervals around synchro rotor coil 404. In known commercially available synchro- and stepper-type gyro compasses, iron cores are used for both stator and rotor coils. However, these are not shown in FIGS. 9 and 10 for clarity. Synchro rotor coil 404 is coupled to synchro AC reference source 406. The rotor voltage is hereinafter referred to as the carrier. Voltages of the same frequency as the carrier are induced in the stator coils. Rotation of the ship and the gyro platform causes synchro rotor coil 404 to rotate within synchro stator coils 402 producing waveforms such as those shown in FIG. 5 which represent the amplitudes of the AC voltages induced in the coils as a function of the shaft position. The synchro stator coils 402, as shown in FIG. 9, are connected to the input signal conditioner of FIG. 1.

FIG 10 shows a gyro compass 420 with a stepper-type output. The rotor of the gyro compass shown in FIG. 10 is formed by a commutator 424 the shaft of which rotates as the ship rotates in heading. The commutator has three conducting rings each covering half the circumference, but displaced over 120° with respect to each other. A fourth or input ring or full circumference feeds a DC voltage to the other segments. The output of the device consists of three phase or output lines 422 connected by way of brushes 423 to each segmented ring of the commutator. The phase lines $\phi A$, $\phi B$ and $\phi C$ are fed into the input signal conditioner as shown in FIG. 1.

As stated above, the output voltages from any of the synchro stator coils 402 of FIG. 9 may vary depending upon the number of turns used and the amount of coupling between the stator coils and rotor coils. The frequency of synchro AC reference source 406 is not the same among all commercially available units, and a complete cycle of the output signals may represent varying amounts of heading change depending upon the exact construction of the commercial units involved.

Figure 1:
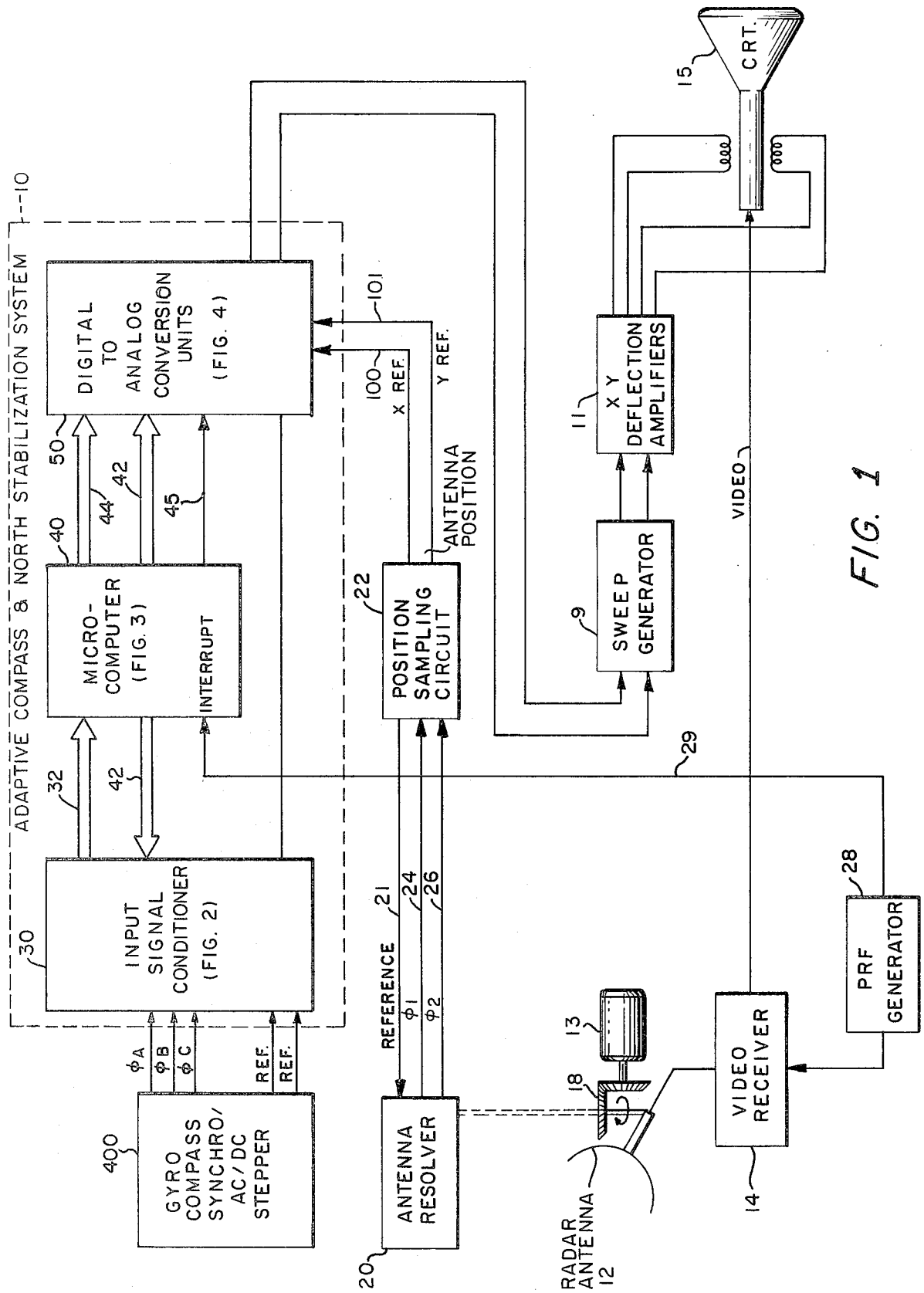
FIG. 1 shows a block schematic diagram of an adaptive compass and north stabilization system as part of a PPI radar system in accordance with the invention.

Referring now to FIG. 1, there is shown a block diagram of an adaptive compass and north stabilization system used as part of a PPI radar system in accordance with the teachings of the present invention. Signals from the outputs of the gyro compass are coupled to an input signal conditioner regardless of whether the gyro compass output is in the form of synchro or stepper signals. For a synchro input, a reference signal is also provided. These signals, designated $\phi_A$ $\phi_B$ and $\phi_C$ from the gyro compass provide changes in the true course of the craft to the adaptive compass and north stabilization unit.

Referring again to FIG. 1, there is shown a block diagram of an adaptive compass drive system 10 used in connection with a PPI radar and embodying the present invention. Radar antenna 12 transmits a signal by means of a transmitter, not shown, and receives radar return signals which are received by receiver 14 which, in a well-known manner, converts the return signals into video signals which are applied by sweep generator 9 and deflection amplifier 11 to the gun of a CRT 15 to intensify its screen. Antenna 12 is rotated by motor 13 by way of gear train 18. The instantaneous antenna position is mechanically coupled, in this case, in a 1:1 ratio to a conventional antenna resolver 20. This resolver on line 21 receives an input reference signal in the form of a square wave generated in a positioning sampling circuit 22. The output of resolver 20 consists of two square waves on output lines 24 and 26, the amplitudes of each being modulated by the position of the resolver as determined by the rotation of antenna 12. The amplitudes of the modulated square waves are sampled by conventional position sampling circuitry 22 which connects these inputs for a short time interval to storage capacitors, not shown, which assume the present value of the amplitude of the square waves. The ratio of analog voltages on these capacitors are a measure of and contain the angular position of antenna 12 and are referred to as the x and y antenna position reference voltages. These voltages are an input to the adaptive compass and north stabilization system 10 by way of lines 100 and 101.

Figures 5A, 5B:
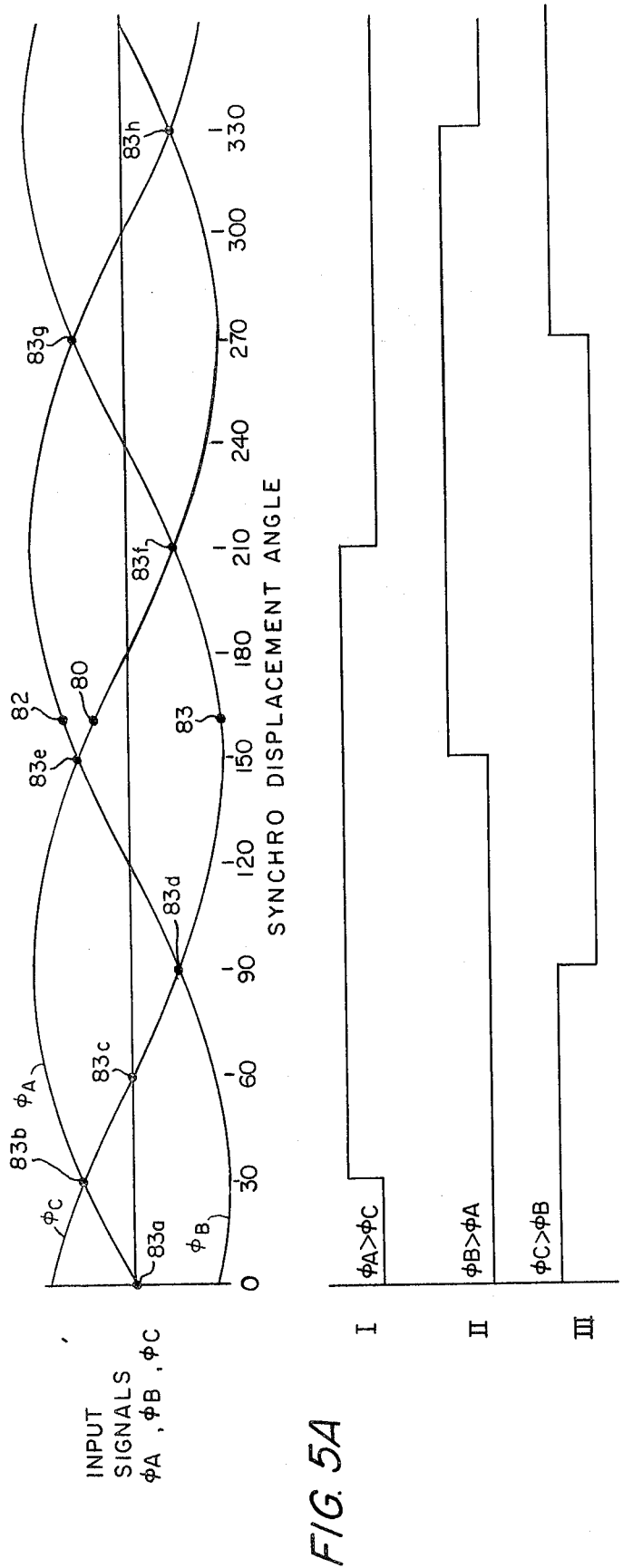
FIG. 5A including waveforms I to III are useful in understanding the operation of the invention and FIG. 5B, waveforms IV to VI show the output of the select decoder used to select one phase between transition points of equal amplitude in the waveforms of FIG. 5A.

Referring to the adaptive compass system 10, output signals in the case of a synchro output of FIG. 9 consists of three phases $\phi_A$, $\phi_B$ and $\phi_C$ and the reference voltage or carrier seen in FIG. 9. The three phases $\phi A$, $\phi B$ and $\phi C$ are shown in FIG. 5A which represent the amplitude of the carrier for each phase. These synchro signals represent the analog rotational position of the synchro shaft and are conditioned or transposed in the input signal conditioner 30, to be described, into a digital representation, that is, the logical "0" or "1" state of each of three output lines 15, 16 and 19 forming an input data bus 32 which is connected to microcomputer 40. The digital information A, B, C on these lines is acted upon in microcomputer 40 to sense a change in the state, ie. from 0 to 1, of any of the lines. It is noted that a change in the state of these lines is caused by a change in the position of the gyro compass, and thus a change in the state of the lines signifies an increment or decrement in the rotation of the gyro shaft, and this represents a change in the course of the craft. Microcomputer 40 has previously stored a digital value representing the former shaft position. The microcomputer now updates or modifies the stored signals to reflect the change extracted from the input signals A, B and C so that the resulting stored value represents the current course of the ship.

This extraction is done as follows: Assuming the state of the data A, B and C on lines 16, 15, 19 is stored in the microcomputer, then when a change occurs, it is compared to the former state and the microcomputer determines the significance of the change as shown immediately herebelow in Table I.

TABLE I

| | 3-BIT ROTATION PATTERN | | | | |
|---|---|---|---|---|---|
| State | 1 Up | 2 Up | 1 Down | 2 Down | 3 Up - 3 Down |
| $A\bar{B}C$ | $\Delta C$ | $\Delta B\Delta C$ | $\Delta A$ | $\Delta A\Delta B$ | $\Delta A\Delta B\Delta C$ |
| $AB\bar{C}$ | $\Delta B$ | $\Delta A\Delta B$ | $\Delta C$ | $\Delta A\Delta C$ | $\Delta A\Delta B\Delta C$ |
| $\bar{A}B\bar{C}$ | $\Delta A$ | $\Delta A\Delta C$ | $\Delta B$ | $\Delta B\Delta C$ | $\Delta A\Delta B\Delta C$ |
| $\bar{A}BC$ | $\Delta C$ | $\Delta B\Delta C$ | $\Delta A$ | $\Delta A\Delta B$ | $\Delta A\Delta B\Delta C$ |
| $\bar{A}\bar{B}C$ | $\Delta B$ | $\Delta A\Delta B$ | $\Delta C$ | $\Delta A\Delta C$ | $\Delta A\Delta B\Delta C$ |
| $ABC$ | $\Delta A$ | $\Delta A\Delta C$ | $\Delta B$ | $\Delta B\Delta C$ | $\Delta A\Delta B\Delta C$ |

For example, starting from a state $AB\bar{C}$ (110), and the incoming signal happens to be $\bar{A}B\bar{C}$ (010) representing a change in the A line from a "1" to a "0", the microcomputer detects a change has occurred in the A line which corresponds according to Table I in a change of one step in a particular direction: $\Delta A$ defines 1 step Up. This can be designated as a change in shaft rotation or increment of rotation to the right. This can be seen in FIG. 5A where waveform I carrying data A is positive, waveform Ii carrying data B is positive, and waveform III carrying data C is negative at the points between 150° and 210°. The change $\Delta A$ to 0 at 210° signifies a one step change to the right. For most gyro compasses, this corresponds to a step of 1/6 of a degree. Other changes, for instance $\Delta B$ at 150° represents one step in the opposite direction (Down). Changes $\Delta A\Delta C$, representing two steps Up or $\Delta B\Delta C$ representing two steps Down, are also extracted and implemented in the microcomputer to subtract from or add to a stored angular value and then store the changed value, for later use to be described. In effect, the microcomputer stores the current course of the ship. Thus, by subtracting or adding the extracted change in bearing information, the latest or updated value of the bearing of the ship is available at all times, permitting the retrieval of current sine and cosine of the bearing.

Referring again to FIG. 1, the microcomputer is synchronized to radar timing by a pulse repetition frequency, PRF, generated in PRF generator 28 for both the receiver 14 and transmitter, not shown. The timing pulse is also applied by way of line 29 to microcomputer 40 and acts as an interrupt or timing signal. Following interrupt, the microcomputer, by way of data bus 44, feeds out to the D to A converter 50 the sine and cosine values corresponding to the stored angular value that represents the angle of the gyro compass shaft. Thus, these digital values represent the angle over which rotation and stabilization of the PPI is to occur by way of the X and Y deflection circuit. The data on bus 42 is transmitted to the various components of the D to A conversion unit 50 by means of address bus 44 and an enable line 45. The D to A conversion unit 50 comprises D to A converters for the sine and cosine data channels. These multiplying D to A converters, to be described, are fed the digital sine and cosine of the rotation angle from the microcomputer. Also feeding the D to A converters are reference inputs for the X and Y antenna position reference X and Y voltages on lines 100 and 101, respectively. These reference voltages are applied to the X and Y D to A converters as directed by the microcomputer by way of the data and address busses. The X and Y sweep reference voltages representing the rotated PPI sweep reference are generated during PPI sweep retrace time sequentially using both D to A converters for each X or Y value of the sweep reference voltage. Thus, for each X or Y sweep reference voltage to the PPI, the microcomputer directs the appropriate X and Y antenna position reference voltages over lines 100 and 101 to the reference voltage input of each D to A converter. Each D to A converter, therefore, receives the X or Y antenna position voltages as directed by a switching unit controlled by or under command of the microcomputer by way of the above data and address busses in a manner to be described in greater detail in connection with FIG. 4. The whole process of updating the PPI reference voltages and thus moving the PPI presentation occurs once per radar period during the sweep retrace time. The latest rotation angle is retrieved for each sweep. Thus, the adaptive compass unit 10 provides, without use of intermediary mechanical devices, real-time X and Y output signals phased with respect to the radar timing sequence in the format of X and Y analog reference voltages used to generate a stabilized and oriented PPI display, usually north-stabilized.

Referring now to FIG. 2, there is shown a block diagram used when the gyro compass output consists of the three-phase synchro signals φA, φB and φC, as described in FIG. 1. These signals represent the amplitude of the AC carrier of the synchro for a given shaft position. In particular, referring to FIG. 2 and FIG. 5A, the use of a synchro as an incremental position device is possible because of the existence of a number of easily detectable conditions such as the zero amplitude of a carrier on a phase line. This is shown in FIG. 5A as the 0, 60, 120, 180, 240 and 300 degree crossover points. This divides a 360° rotation of the synchro shaft into six incremental steps. The transitions on the phase lines or waveforms at these natural division points are referred to as "major transitions". Thus, when one rotation of 360° of a synchro shaft corresponds to a one degree change in the course of the ship, as is often the case, the corresponding incremental step is one-sixth degree.

The invention selects as its major transition points, not the usual above-referred to zero crossings, but rather the points of equal carrier amplitude from a comparison of any two waveforms. This is seen in FIG. 5 to be at 30, 90, 150, 210, 270 and 330 degrees. This selection eliminates transient common mode disturbances on the input phase waveforms φA, φB and φC since there is, in effect, no fixed reference level against which a comparison need be made. This selection permits the phase components, to operate at very low signal levels while permitting an accurate amplitude comparison.

As seen in FIG. 2, the three-phase signals φA, φB and φC are fed to an attenuator 60 of input signal conditioner 12. The voltage on each phase line is attenuated by voltage divider 61, 62, voltage divider 63, 64, and voltage divider 65, 66, which attenuate the input signals on each line inasmuch as the output at the midpoint of each of the three voltage dividers is connected, respectively, to the input of three phase comparators 71, 72 and 73 of comparison unit 70. The signal input to each comparator is attenuated preferably by a factor of approximately 20 by the output at the midpoint of each voltage divider. For example, the input resistors 61, 63 and 65 are approximately 70 thousand ohms and the output divider resistors 60, 62 and 64 are approximately 3.5 thousand ohms. It should be noted that not only is the loading of each synchro input line negligible small, but also a great or wide range of input voltages can be used without modification of input signal circuitry due to the use of attenuator 60. At the same time, each phase comparator is capable of responding to a very small signal change of approximately a few millivolts between each two input phase lines to be compared, even in the presence of relatively high common mode signal interference picked up on the three phase lines from on-board transients from heavy electrical apparatus and the like.

It should be understood that the output of comparator 71, 72 and 73 is a square wave of the frequency of the carrier. Thus, for a given position of the gyro shaft, say at 160° as seen in FIG. 5, the amplitude of phase A, during the positive half-cycle of the carrier, is positive (point 80). Thus, it can be seen φA is greater than φC (point 83), φB (point 82) is greater than φA, and φC is smaller than φB. This is seen in waveforms I, II and III of FIG. 5A which show the output of the amplitude comparison for the positive period of the carrier. For the negative period of the carrier, the outputs are inverted with respect to I, II and III shown in FIG. 5A. These respective outputs therefore are seen as square waves at the output of the three comparators 71, 72 and 73 in FIG. 2.

The outputs of the three comparators contain the position of the synchro shaft and are represented in the relative phases of square waves 78, 79 and 81. These waveforms are strobed into a conventional storage register 90 which acts as a buffer for the microcomputer. This strobe occurs preferably near the middle of either the positive or negative period of the carrier frequency applied at the reference input terminals 52 and 53. Thus, the position information is stored as a digital code in storage register 90. The strobe is generated by means of phase shift-isolator 55 and threshold comparator 67.

The synchro reference input signal at terminals 52 and 53 is a constant amplitude carrier wave, not shown, in phase with the synchro phases and therefore with the three comparator outputs. That is, the zero crossings of the synchro reference signal and those at the output of the phase comparator occur at the same time. Referring to the phase shifter and isolator 55, the current reference signal is shifted over approximately 90 degrees whereby its zero crossings now occur close to the midpoint of the carrier waveforms 78, 79 and 80. This is achieved by the RC elements in circuit with back-to-back diodes in phase shifter 55. Optical isolator 58 isolates and rectifies the phase shifted current in the circuit in a well-known manner. The output voltage of the optical isolator 58 is waveform 87 which is the rectified half wave of the current through resistor 59 and is applied to the input of conventional threshold comparator 67 where it is compared with a well-known reference source 61 to produce a square strobe pulse 86, the positive transition of which occurs approximately half way between the ccarrier zero crossings for its positive half cycle. Thus, the positive transition of the output wave 86 of the threshold comparator on line 52 strobes the latest position information at the outputs of phase comparator 70 into register 90 by way of lines 74, 75 and 76 which is the digital code provided to the microcomputer. The angular coded information of relative shaft position is held in register 90 until updated during the following carrier period which occurs at the next positive transition of waveform 86. In the absence of angular change of the synchro shaft, the coded output remains the same. The coded waveform bits 1-3 are outputs A, B and C on lines 16, 15 and 19 which form a digital code provided to the microcomputer 40 of FIG. 1 on the data bus 32 of FIG. 1.

Referring now to FIG. 3, digital signals from storage register 90 are applied to the input of interface unit 91 of the microcomputer 40 by way of data bus 32. Microcomputer 40 is implemented using components from the Motorola 6800 family of microprocessors using the following items; an interface unit 91, which is Motorola MC6821, a microprocessor MC6802 which is an 8 bit microprocessor with a clock controlled by a crystal 93. The MC6802 also contains a random access memory, not shown, which provides the temporary storage necessary for performing calculations and storage of angular data. Also included in microcomputer 40 is an MC6840 programmable timer 94 and Read Only Memory 95 which is a model MCM2716 which stores the operational sequence for the computer. Decoder 96 permits the microprocessor 92 to address the other components in well-known computer operation.

Briefly, the signals from storage register 90 of FIG. 2 are interfaced into the microprocessor 92 when the microprocessor addresses interface unit 91 and instructs it to put coded input information on the data bus 42 for processing. As instructed by the stored data in the ROM 95, called up in sequence by the microprocessor, input information containing the current digital position code is compared by the processor to the previous digital code stored in the random access memory to determine the occurrence of a single or multiple step increment or decrement in the position of the gyro input shaft. The number of steps is added to or subtracted from the previous input shaft angle, also stored in the random access memory. Thus, the current values of synchro shaft angle, are available in the random access memory of the microcomputer, and therefore the current sine and cosine of the shaft angle are available after retrieval from a table stored in read only memory 95. In response to the radar timing pulse, the microprocessor provides the appropriate sine and cosine values by way of the data bus 42 and address lines 44 to the input of D to A conversion unit shown in FIG. 1 and FIG. 4, properly timed with respect to the radar pulse by the programmable timer 94 which times the output data from the microprocessor with respect to the pulse repetition frequency, PRF, the basic radar timing. For example, the update of the rotated PPI reference voltages occurs in real time during the retrace of the radar PPI sweep. Timer 44 acts in response to microprocessor instructions to time the output data. Accordingly, the updated sine and cosine values of the rotation angle of the PPI become available to the D to A conversion unit of FIG. 1 at the beginning of the retrace permitting the D to A unit to combine this angular data with the present X and Y antenna position to arrive at the rotated PPI X and Y sweep reference voltage to maintain a stabilized and oriented PPI presentation under conditions of changing of ship's course.

Figure 4:
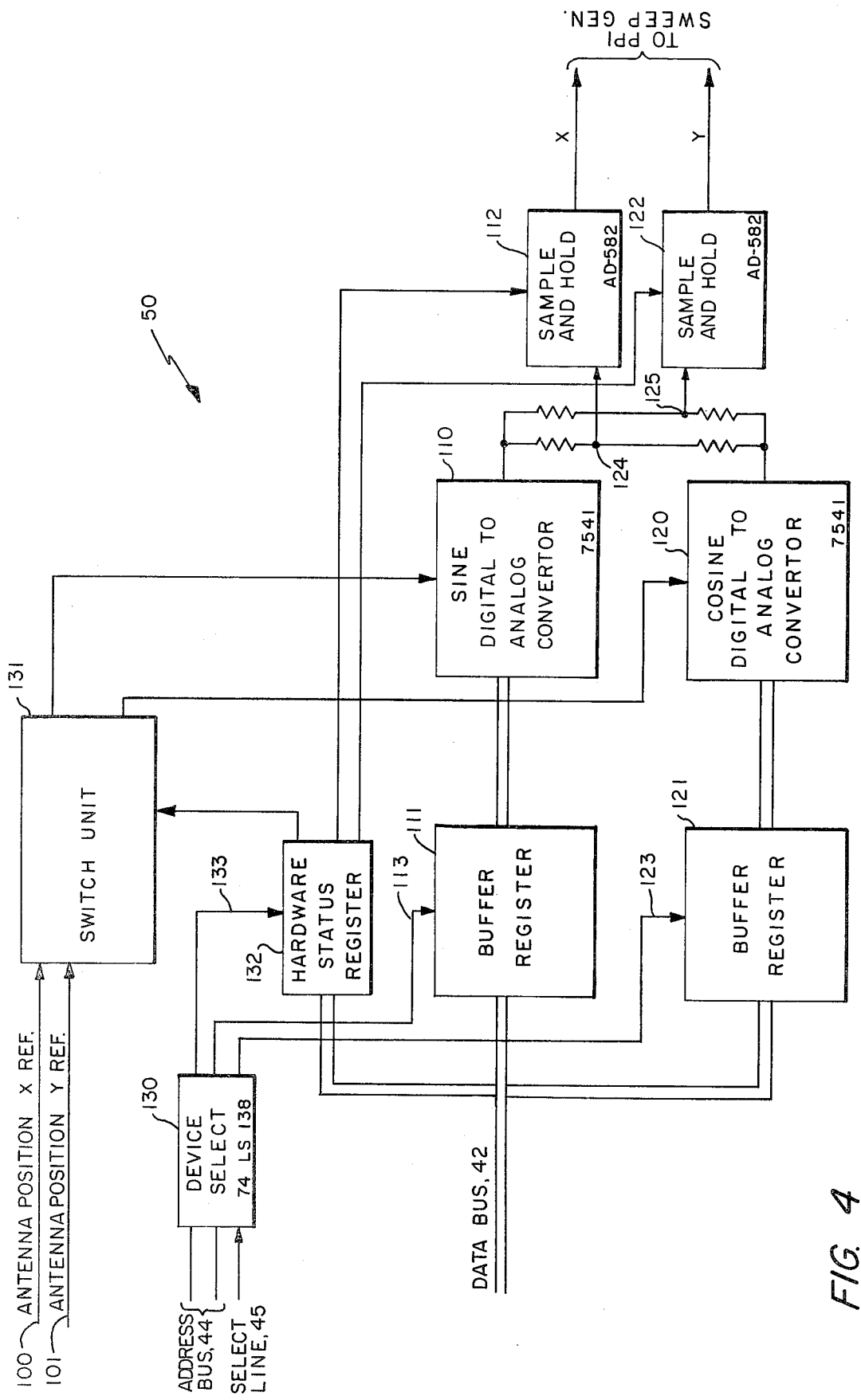

Referring now to FIG. 4 there is shown a block diagram of the digital to analog conversion circuitry. A set of two 12-bit monolithic multiplying D to A converters, one (110) for the X reference channel and the other, (120) for the Y reference channel, receive the PPI rotation angle as 12-bit digital information, and the current antenna position angle as X and Y antenna position reference voltages, which are applied by lines 100 and 101 to the D to A converters 110 and 120 at the D to A reference voltage inputs. The analog output of each D to A converter is proportional to the product of its reference voltage and the digital value entered into the converter.

Figure 7A:
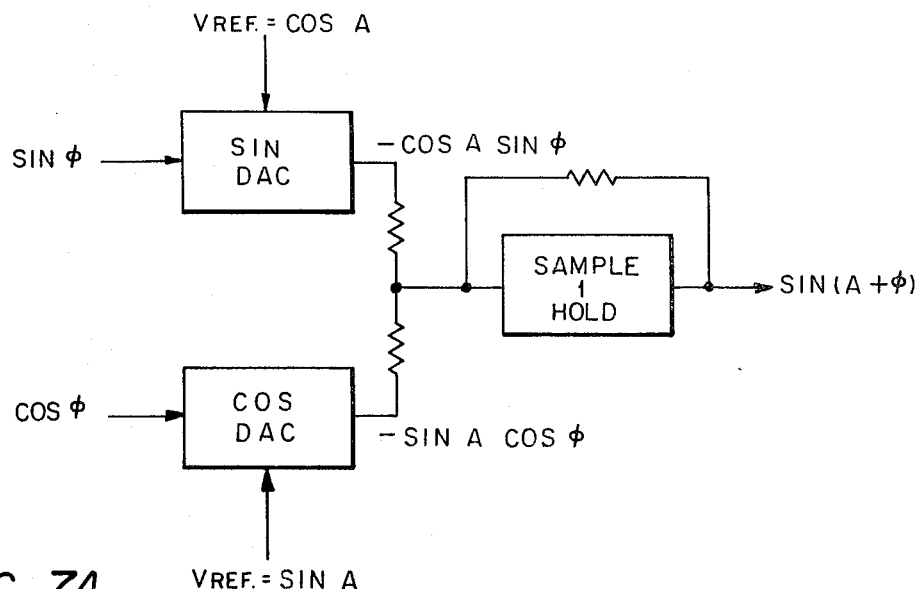
FIG. 7a and 7b are block diagrams used to describe an electronic north stabilization device which can be used in connection with the description of the digital to analog converter of FIG. 4.
Figure 7B:
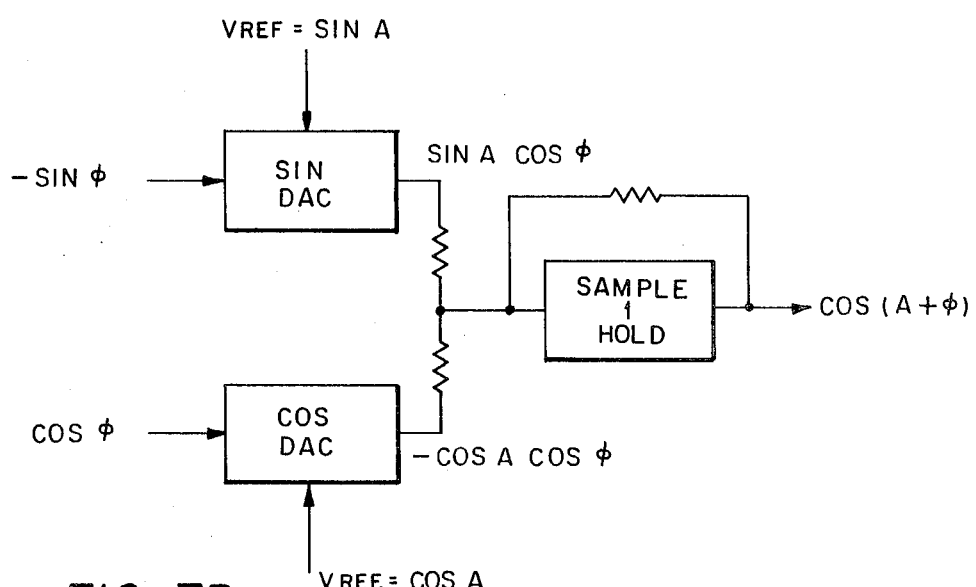

The microcomputer enters the digital PPI rotation data by way of data bus 42 and directs the data to well-known buffer registers, 111 for the X channel and 121 for the X channel. The data routing is accomplished via "Device Select" unit 130 which decodes the address inputs from the computer. Select line 45 of FIG. 4 selects the digital to analog conversion unit 50 of FIG. 1, and the three lower address bits of the address bus 44 select the individual registers within unit 50 by producing dedicated clock lines 113, 123, 133 to each register. The digital inputs, thus set and applied at the inputs of the D to A converters, are the sine or cosine of the desired PPI rotation angle. The D to A's 111 and 121 are bipolar and produce negative or positive analog voltages. The antenna position X, Y reference voltages are connected to the D to A reference voltage inputs via well-known switch unit 131, which can be a well-known analog device model AD7502 and which connects the antenna position X reference voltage to be converted to either D to A converter 110 or 120 and the Y reference voltage to be connected to either D to A 120 or D to A 110, FIGS. 7A and 7B show these connections for the sake of clarity. The switch positions are controlled by the outputs of Hardware Status register 132. The status of this register is set by the microcomputer 40 by way of data bus 42 and address inputs as decoded by 130. The microcomputer, therefore, at any time directs the antenna position reference voltages as required to obtain the proper outputs from the set of D to A's to provide the PPI sweep reference voltage. The outputs of the D to A's are connected to the input of sample and hold units 112 and 122. Under control of the output of the hardware status register 132, and therefore, as directed by the microcomputer at a given time, each sample and hold unit is set to "sample" whereby the X and Y output assumes the value applied to its input, after which the unit is reset to "hold". The D to A converters providing the analog input during the "sample" period are not free for the next task, while the sample and hold unit preserves the converter output. The microcomputer precisely times the events in the digital to analog conversion unit 50 of FIG. 1 such that PPI X, Y sweep reference voltages at the output of D to A converters 112 and 122 are updated during a radar retrace period to provide the X and Y reference value for the next sweep.

FIGS. 7A and 7B show the data inputs provided to accomplish the electronic PPI stabilization and orientation to be described. FIG. 7A shows the update of the PPI sweep X reference channel. The microcomputer transfers sequentially the sine value of the rotation angle $\phi$ to D to A converter 111 as described above, the cosine value of the rotation angle $\phi$ to D to A converter 121, directs the Y antenna reference voltage (proportional to the cosine of the antenna orientation angle A) to D to A converter 111 as its reference input voltage and the X antenna reference voltage (proportional to the sine of the antenna orientation angle A) to D to A converter 121. After a settling time of about 5 microseconds, the outputs of the D to A's stabilize to the products $-\cos A \sin \phi$ for D to A 111 and $-\sin A \cos \phi$ for D to A 121. The microcomputer now directs sample and hold unit 112 to sample in a well-known manner the sum of the D to A outputs available at summing junctio 124. The output is the inverse of the term of the outputs of the D to A's, that is, $\sin(A+\phi)$ and then directs the unit 112 to hold this value. The microcomputer now proceeds to transfer the inverse of $\sin \phi$ to D to A converter 111, which is now free for the next task and controls the switch to exchange the antenna position reference voltages on the units 111 and 121. The outputs of the D to A's 110 and 120 now assume the values indicated in FIG. 7B. The microcomputer now directs the sample and hold unit 122 to sample in a well-known manner the sum of the D to A outputs at summing junction 125. After approximately 5 microseconds, the output of unit 122 has assumed the inverse of this value, that is $\cos(A+\phi)$ and the microcomputer resets unit 122 to the "hold" mode. The sets of outputs are the PPI sweep X, Y reference voltages for the rotated PPI presentation. The process of updating the sweep reference voltage is accomplished within an 80 microsecond retrace period. It should be noted that the electronic PPI orientation system, contrary to the relatively slow speed of the mechanical system, permits an almost instantaneous orientation of the PPI display to the desired stabilized direction.

It should be noted that the description of the preferred embodiment above started from a synchro-type gyro compass input which in this embodiment utilizes a division of a 360° synchro shaft rotation by a factor 6. The standard steps of 1/6° are achieved by a compass synchro shaft coupling ratio of 360:1. Other coupling ratios such as 180:1 or 36:1 are frequently used. The present invention in a further embodiment, to be described below, resolves these coupling ratios by adding particular decoding and selection circuitry of the input signal conditioner of FIG. 2, and by selecting in a well-known manner, another sequence of instructions in the microcomputer to process the input digital code. The remaining components of the system, ie. microcomputer and digital to analog conversion units, remain the same as seen in FIG. 2.

In addition to the feature already described above, the microcomputer 40 after detection of a transition in the digital input code obtained from register 90, verifies the validity of the new input. For example, an all "zero" or all "one" input constitutes an error condition and is ignored by the microcomputer as an invalid input. Before a new position is accepted by the microcomputer as the current position, a change of the digital code in response to a change of ships course, in register 90 is confirmed for a preset number of periods before a new position is accepted by the microcomputer as the current position. This permits the removal of input jitter by adding an effective hysteresis or delay to the position data inputs received from the gyro compass.

Multiphase systems as opposed to two-phase systems, such as an incremental optical encoder, contain more information than just a single one step up or down. The synchro position input, described above, provides a three-element digital code A, B, C at the output of register 90 and is interpreted as one or two steps up or down, as previously described with respect to Table I.

This two step interpretation permits higher input data speeds, permitting the system to accept faster changes in course from the gyro compass than when a single step change is processed as in the prior art. The maximum input rotation speed that is now capable of being accepted corresponds to a 120° synchro shaft position change per carrier period. For a syncro used with a 60 Hz carrier, this speed of the synchro shift can amount to a speed of 20 revolutions per second or 1200 RPM. Using a 360:1 compass synchro coupling, this amounts to a course change of 20°/per second. Airborne applications where faster course changes are frequently encountered use a 400 Hz carrier. The speeds are proportionally higher, such as speeds up to approximately 130° course change per second.

Figure 6:
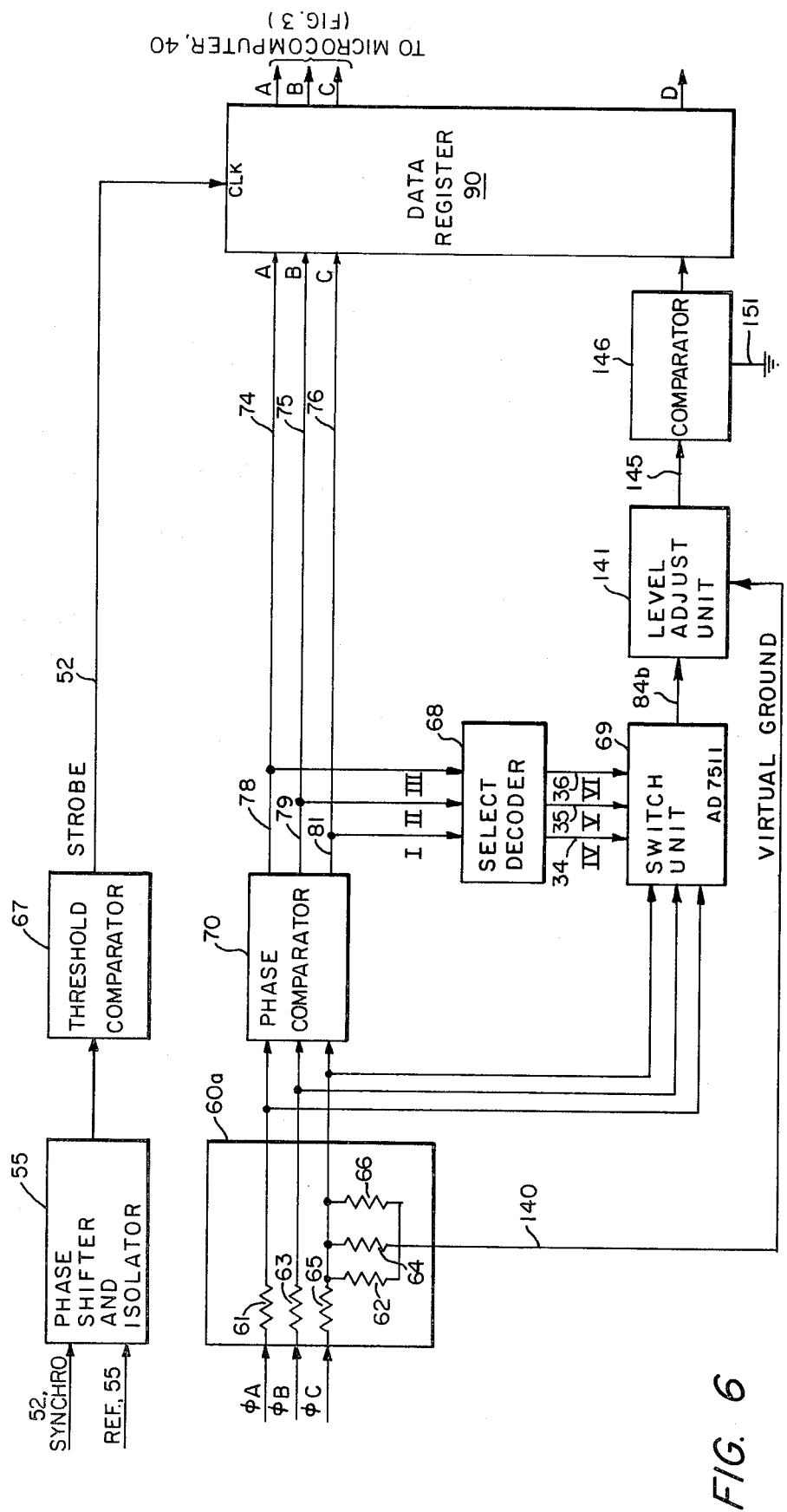
FIG. 6 is a synchro system wherein a 360 degree synchro shaft revolution is divided into twelve increments to represent the angular position of the synchro shaft in place of the division by six utilized in FIG. 2.

Referring now to FIG. 6 there is shown a block diagram of the input signal conditioner wherein a 360° synchro shaft revolution is divided by 12, as is the case when the gyro compass synchro shaft coupling is 180:1. Added circuitry consists of a select decoder 68 which operates on the outputs 78, 79, 81 from the phase comparators 70 by taking the "exclusive OR" between any two outputs, of waveforms I, II, or III of FIG. 5A. FIG. 5B waveforms IV, V and VI show the result, in which, for example at 60°, waveform I and III are both "high", to yield a zero output on waveform VI, selecting $\phi$C.

The output lines 34, 35, and 36 of select decoder 68, respectively, carry waveform IV, V, and VI. Only one of these waveforms is negative due to exclusive OR decoding of unit 68 and shown in FIG. 5B. The negative portion of the waveform is used to select the particular attenuated $\phi$A, $\phi$B, or $\phi$C signal at the input of switch unit 69 to provide on line 84b this selected and attenuated signal. Such unit can be a well-known solid state switch such as AD 7511 of Analog Devices. Each line IV, V, or VI when negative, therefore selects the input phase signal $\phi$A, $\phi$B, $\phi$C with decreasing amplitude between major transition points. The selected attenuated phase $\phi$A, $\phi$B or $\phi$C on line 84b is compared to a voltage level to achieve a subdivision of the synchro shaft revolution between major transition points 83B, 83D, 83E, 83F, 83G, and 83H shown in FIG. 5A. These are points of equal amplitude as previously described with respect to the operation of phase comparator of FIG. 2. Subdivision transitions are referred to as "minor transitions" below. The selection of the phase with decreasing amplitude between any two points of equal phase amplitudes, as representative of the input signal, effectively replaces the set of three individal phases with sinusoidal envelopes with a single signal with a triangular envelope formed by points 83A, 83B, and 83C shown in FIG. 5A. The selected phase is susceptable to any common mode transient disturbance on the input signal. The invention removes the common mode signal by observing that the sum of the instantaneous amplitudes of the synchro phases are always zero, providing the means to establish a virtual zero for the synchro input signal at the common point of the voltage dividers of attenuator 60. Connected by way of line 140 to level adjust unit 141, the voltage difference between this virtual zero and local ground on line 140 is proportional to the common mode transient and is used to eliminate any common mode component from the selected phase $\phi$A, $\phi$B or $\phi$C in the level adjust unit 41. Level adjust unit 141 of FIG. 6 acts upon the selected phase signal on line 84b to adjust its level according to the value of the signal on line 140, representing the common mode voltage. The average voltage of the output signal on line 145 is now at the local ground level and thus the common mode signal is removed. This ground level referenced signal permits voltage comparison to be made in comparator 146, with respect to the local ground, thus defining the midpoint between the major transitions. The output of the comparator 146 is a square wave, the "1" OR "0" output depending on whether the amplitude of the carrier is positive or negative. For instance, in FIG. 5B, waveform VI, during its negative state selects $\phi$C between points 83B and 83D. The output of comparator 146 is "1" between 83C and 83B, "0" between 83C and 83D during the positive phase of the carrier and inverted during the negative phase. This output is fed to the data register 90 and clocked into the same way as described above for the 360:1 synchro, removing the carrier. The digital code at the output of the register 90 now consists of 4 bits namely A, B, C and D to be examined by the microprocessor and processed with the transitions in the input code A, B, C, and D, to provide update of the stored position of the gyro compass and thus of the course of the ship.

TABLE II

| State | 4-BIT ROTATION PATTERN | | | | | | | |
|---|---|---|---|---|---|---|---|---|
| | 1 Up | 2 Up | 3 Up | 4 Up | 1 Down | 2 Down | 3 Down | 4 Down |
| ABCD | ΔD | ΔCΔD | ΔC | ΔCΔD | ΔA | ΔAΔD | ΔBΔAΔD | ΔAΔB |
| ABCD | ΔC | ΔCΔD | ΔCΔBΔD | ΔCΔB | ΔD | ΔAΔD | ΔA | ΔAΔB |
| ABCD | ΔD | ΔBΔD | ΔB | ΔAΔB | ΔC | ΔCΔD | ΔAΔCΔD | ΔCΔA |
| ABCD | ΔB | ΔBΔD | ΔBΔAΔD | ΔAΔB | ΔD | ΔCΔD | ΔC | ΔCΔA |
| ABCD | ΔD | ΔAΔD | ΔA | ΔCΔA | ΔB | ΔBΔD | ΔCΔBΔD | ΔBΔC |
| ABCD | ΔA | ΔAΔD | ΔAΔCΔD | ΔCΔA | ΔD | ΔBΔD | ΔB | ΔBΔC |
| ABCD | ΔD | ΔCΔD | ΔC | ΔBΔC | ΔA | ΔAΔD | ΔBΔAΔD | ΔAΔB |
| ABCD | ΔC | ΔCΔD | ΔCΔBΔD | ΔBΔC | ΔD | ΔAΔD | ΔA | ΔAΔB |
| ABCD | ΔD | ΔBΔD | ΔB | ΔAΔB | ΔC | ΔCΔD | ΔAΔCΔD | ΔCΔA |
| ABCD | ΔB | ΔBΔD | ΔBΔAΔD | ΔAΔB | ΔD | ΔCΔD | ΔC | ΔCΔA |
| ABCD | ΔD | ΔAΔD | ΔA | ΔCΔA | ΔB | ΔBΔD | ΔCΔBΔD | ΔBΔC |
| ABCD | ΔA | ΔAΔD | ΔAΔCΔD | ΔCΔA | ΔD | ΔBΔD | ΔB | ΔBΔC |
| ABCD | ΔD | ΔCΔD | ΔC | ΔBΔC | ΔA | ΔAΔD | ΔBΔAΔD | ΔAΔB |

Table II above shows the decision format for the microprocessor which decides whether input transitions signify one, two, three, or four steps up or down. A compass synchro coupling ratio 180:1 producing 1/6° steps thus permits a compass course variation of up to 40°/second with a 60 Hz carrier.

Figure 11:
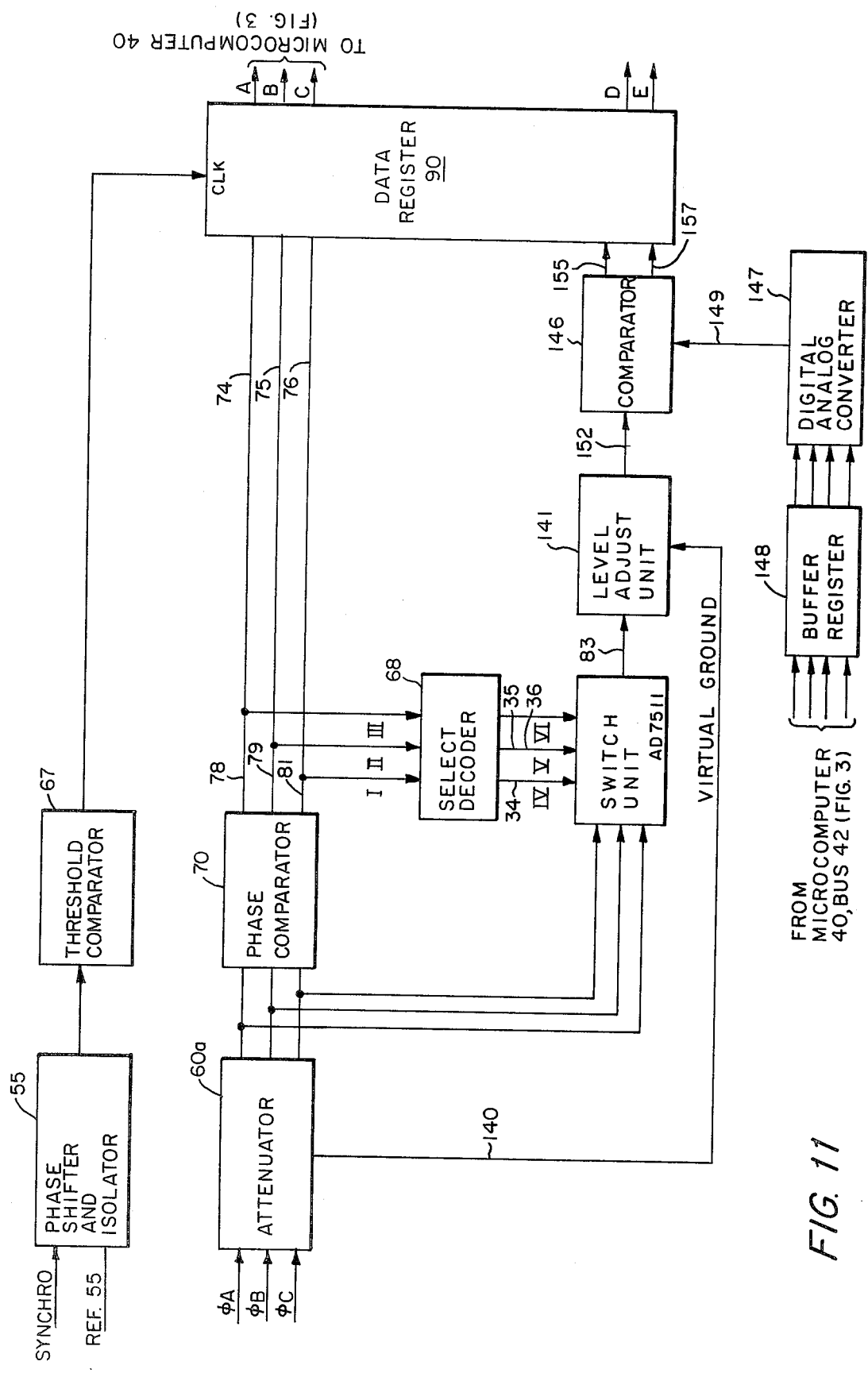
FIG. 11 is a block diagram of a synchro system in which finer venier division of synchro position is obtained.

FIG. 11 is a block diagram of the input signal conditioner for the case where a subdivision between major transition point greater than 2 is provided, such as for a compass synchro shaft coupling of 36:1, using nine minor transition points between adjacent major transition points thus giving a subdivision of ten minor steps between the major transitions. Slower shaft speeds can now be used to give the same 1/6° step changes in course. The implementation is essentially the same as for the method described where comparator 146 adds 1 minor transition point. The comparison is local ground 151 in FIG. 6 is now replaced by a comparison with an analog voltage obtained from a four-bit D to A converter by way of line 149. The digital input to the D to A convertor 147 is provided by the microcomputer 40 by way of a buffer register register 148.

More particularly, comparator 146 determines whether the carrier amplitude of the selected phase on line 152 is within the step assigned by the microcomputer 40 by means of storing a particular step value in buffer register 148 which is then converted by D to A converter 147 into the analog comparison voltage. When the carrier amplitude on line 152 is higher than a predetermined range of voltages adjacent to the analog comparison voltage on 149, a digital output "1" occurs on increment line 155, when lower than this range of analog voltage a "1" occurs on decrement line 157. In the case where the carrier amplitude on line 152 is within this range of analog voltages, both increment and decrement lines are "0". Increment and decrement lines are strobed simultaneously with outputs A, B, and C into register 90, in the previously described manner. The digital code at the output of the register 90, now consists of 5 bits namely A, B, C, D and E, with D and E commands to the microprocessor to respectively increment or decrement the digital value strobed into buffer register 148 of FIG. 11. Thus, the outputs of register A, B, C, D and E on data bus 32 are processed in the microcomputer which raises or lowers its output to the D to A converter 147 via buffer register 148 until equalization of the two input signals to comparator 146 occurs. This determines the particular minor step which corresponds to the position of the gyro synchro shaft. When detecting a transition from one step to an adjacent step, the microcomputer adds or subtracts the step value to the present stored value representing the stored angular course of the ship. The 4-bit D to A converter permits implementation of subdivisions up to 16. The linearity of carrier envelope on line 152 between major transition points is such that a subdivision of up to 20 monotonous increments is possible. In case of misalignment, the microcomputer provides automatic position correction at the major transition points.

Figure 8:
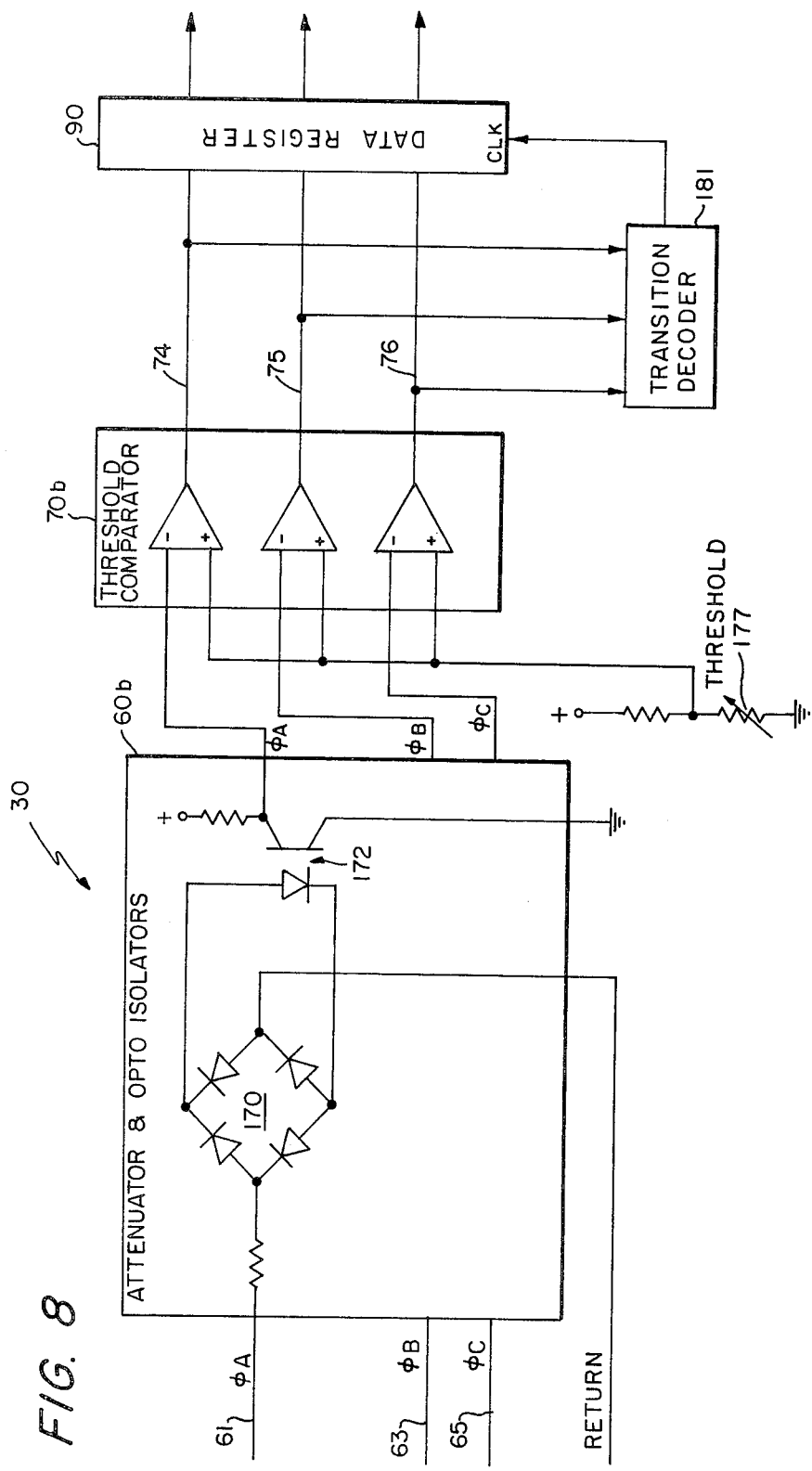
FIG. 8 is a three-phase stepper gyro compass output system suitable for either polarity.

Referring now to FIG. 8, there is shown a block diagram of the input signal conditioner 30 for use when the gyro compass has a stepper output instead of a synchro output. For a DC stepper, the outputs of the gyro compass are φA, φB and φC waveforms which appear on lines 422A, 422B and 422C, respectively, as shown in FIG. 10. FIG. 10A shows when each of these waveforms is positive (solid) or negative (blank). The input conditioner 30 accepts DC signals on lines 61, 63 and 65 of either polarity over a wide range of voltage levels. The attenuator and isolator 60B includes a diode bridge 170 connected across line 61 and 171 in series with optical isolator 172 which operates in a manner similar to the optical isolator 58 of FIG. 2. φB and φC are coupled in the same manner as φA. The use of the diode bridge 170, in a well-known manner, permits signals of either polarity to be accepted with the current through the optical isolator independent of the polarity. Thus, the polarity of the source 175 of FIG. 10 can be of either polarity. Comparators 70B are now configured to compare each phase input against a preset level set by potentiometer 177. The outputs A, B, C on lines 74, 75, 76 are clocked into register 90 whenever a transition occurs as detected by transition decoder 181. For AC stepper inputs, when DC source 175 of FIG. 10 is replced by an AC source, the signal has a carrier, and the waveforms of FIG. 10A are the envelopes of the carrier amplitudes. Data is now clocked into the register 90 in the same way as described for synchros as in FIG. 2, instead of using transition decoder 181.

This completes the description of the embodiments of the invention illustrated herein. However, many modifications thereof will be apparent to persons skilled in the art without departing from the spirit and scope of the invention. Accordingly, it is intended that the invention be not limited to the particular details of the embodiments described herein except as defined by the appended claims.

What is claimed is:

1. An adaptive compass drive system for use with a radar system including a PPI display adapted to respond to either DC or AC incremental positioning devices of the stepper-type output or synchro-type gyro compass output comprising means for providing preconditioning of the three-phase carrier output signals of either type of said incremental positioning devices into stepped waveforms the crossover points of equal carrier amplitude representing the angular change in the position of the gyro compass shaft of said incremental positioning devices;

means for determining the values of equal amplitude for any two phases of said DC stepper-type or said AC synchro-type conditioned signals in said preconditioning means;

said latter means including means for sensing the occurrence of single or multiple step increment or decrement output signals;

a microprocessor adapted to operate in response to the output signals of said preconditioning means and to derive from a comparison with previously stored values from said preconditioning means without the use of intermediary mechanical devices a coded change signal representing incremental change in angular position of said gyro compass shaft, said microprocessor further including real-time output signal means in a format of digital codes representing the sine and cosine of the intended PPI rotation angle; and means including a D to A unit to combine digital codes representing said coded change signal from said microprocessor with X and Y position voltages from said radar system to generate X and Y sweep reference voltages for orientation of the PPI display of said radar system.

2. The combination of claim 1 wherein said preconditioning means comprises phase comparator means including an exclusive OR circuit, fed by corresponding output signals from said incremental positioning device.

3. The combination of claim 1 wherein said preconditioning means includes optical isolator means for isolating reference signals of said gyro compass from signals within said system.

4. The apparatus of claim 3 in which said preconditioning means includes a threshold comparator which rectifies the output of said optical isolator to produce a square wave strobe pulse for timing preconditioned signals from said incremental positioning device into a data register.

5. An adaptive compass drive system for use with a PPI including an incremental positioning device of the gyro compass output type;

means in response to said gyro compass output to provide output phase signals, the relative amplitude of which is a function of angular position of the shaft of said incremental positioning device;

comparator means for producing coded signals, the transitions of which represent points of equal carrier voltage amplitudes between any two phases of said output phase signals;

means for storing said coded signals as coded data in an output register;

a microprocessor containing stored previous values of said coded data representing a position, said microprocessor accepting said coded data from said output register and deriving from comparison with said stored values representing said position a coded change signal representing an incremental change in angular position of said gyro shaft; and means including a digital to analog converter operating in response to a coded change signal from said microprocessor to provide analog directional signals to orient said PPI with respect to changes in compass bearing.

6. The combination of claim 5 in which said storing means operates in response to a strobe signal generated from a synchro reference signal and adapted to occur near the middle of each of either the positive or negative period of the output phase signals.

7. The combination of claim 5 wherein said digital to analog converter includes a sample and hold circuit adapted to update during the sweep retrace period X and Y sweep reference voltages for the next sweep of the PPI.

8. The combination of claim 5 in which the output of said comparator means is fed to select decoder means adapted by exclusive OR action to provide a particular selection signal for application to switch unit means, said switch unit means operating in response to said selection signal to select from the output phase signals of the gyro compass output a phase signal of decreasing amplitude between major transition points thereof;

means including level adjust means adapted to adjust the level of said decreasing amplitude signal by an amount determined by the virtual ground signal derived from said output phase signals to provide an output signal balanced with respect to the local ground level; and comparator means fed by said balanced signal to provide a coded signal to a data register which identifies the positive and negative amplitude of said balanced signal, whereby a four bit code is provided at the output of said data register.

9. The combination of claim 5 whereby said comparator means is adapted to select points of equal carrier amplitude between any two phases as position transition points whereby the effects of common mode electrical disturbances are automatically removed and whereby the attenuation of the gyro output signals is permitted.

10. An adaptive compass drive system for use with a PPI and adapted to respond to incremental positioning devices of the gyro compass output type comprising means for providing preconditioning of the output signals of said incremental positioning devices into stepped waveforms representing increment or decrement of the position of said incremental positioning devices;

means for determining the values of equal amplitude for any two phases of said conditioned signals in said preconditioning means;

said latter means including means for sensing the occurrence of a single or multiple step increment or decrement of the position of the gyro input shaft sensed by said preconditioning device to generate coded signals representing values between positions of substantially equal amplitude of said input signals to said compass driver system; means including a microprocessor acting in response to a comparison of said coded signals and previously stored coded signals representing a position to provided without the use of intermediary mechanical devices real-time output signals in a format of digital coded signals representing intended PPI rotation angle and timing signals; and means in response to said output signals to generate analog output voltages to stabilize and orient said PPI display.

11. The combination of claim 10 in which said preconditioning means includes an attenuator adapted to reduce the level of input signals to permit operation over a wide range of input voltages while reducing the loading of the compass output signal lines.

12. An adaptive compass drive for use with a PPI radar display for operation with a gyro compass adapted to operate over a plurality of supply voltages and frequencies from a synchro output and a stepper-type output for orienting the display on said PPI for providing during change in heading of a craft, a north stabilization for the radar display comprising in combination:

means for producing three phase carrier signals and reference signals from a gyro compass having a synchro configuration;

phase comparator means operating in response to any two of said three phase carrier signals to produce multiphase signals with transitions representing equal amplitude points of step change in the heading of said craft;

an output register operating in response to said reference signals to store a digital code representing values of said transition signals in the form of compass position data at the outputs of said register;

a microprocessor adapted to respond to a comparison of previously stored values of coded data representing position with said compass position data to provide position change signals representing angular output data in digital format;

a D to A converter adapted to accept said angular output data in digital format to provide a set of analog X and Y directional signals; and means in response to said directional signals to provide a rotation of said display which corresponds to a north stabilization during a change in heading.

13. The combination of claim 12 in which the output of said phase comparator means is fed to a transition decoder adapted to provide a synchronization signal for clocking outputs of said phase comparator means into said storage means whenever a transition is detected.

14. The combination of claim 13 in which stepper-type compass output signals are rectified and applied to said phase comparator means and compared to a predetermined level.

15. An adaptive compass drive system for use with a PPI display capable of operation over a wide variety of compass outputs and supply voltages and frequencies by provision of combination signals which employs a phase comparator to convert gyro compass outputs in the form of three-phase analog signals into a digital code by comparison with a predetermined DC reference, the transitions of which signify an angular change in position of the gyro compass shaft providing said compass outputs, and comprising the steps of:

utilizing a microprocessor to compare the digital code with a previously stored digital code representing the previous compass outputs and detecting a change in state of the present coded signal;

converting said change of said coded signal representing a predetermined change in the angular position of the shaft into an increment or decrement signal to modify a stored digital value representing the previous position of said shaft, said microprocessor deriving from said stored digital value a position change signal the sine and cosine value representing the rotation angle of said gyro shaft and the intended orientation of the PPI display; and utilizing conversion means fed by said sine and cosine value to apply an analog signal representing angular position values directly to the deflection circuit of the PPI without use of mechanical drive devices for said PPI.

16. An adaptive compass drive system for use with a PPI and adapted to respond to either DC or AC incremental positioning devices of the synchro-type gyro compass output comprising:

means for providing synchro output three-phase carrier signals, the amplitudes of which represent the analog rotational position of said incremental positioning devices;

input signal conditioner means to convert said analog rotational signals into a digital representation by sensing and comparing with a predetermined direct current reference voltage the points of equal amplitude of any two of three analog phase rotational signals to produce digital representation signals;

microcomputer means receiving said digital representation signals to sense a change in the state of said digital representation in response to a change in position of said gyro compass from a digital representation of a previously stored position, said latter means including means for comparing digital shaft position signals with digital values representing previously stored angular shaft position to extract position change signals to permit an update of the stored angular values which represent the current course of a ship;

an antenna resolver generating X and Y position reference voltages; and

D to A converter means fed by an X and Y position reference voltage from an antenna resolver in conjunction with stored angular data supplied by the microprocessor means to provide analog outputs representing X and Y sweep reference voltages generated during PPI retrace time to rotate said PPI presentation once per sweep period to maintain an electronically stabilized and oriented PPI.

17. An adaptive compass system for use with a radar system having a PPI display comprising in combination:

means for conditioning three phase carrier output signals from incremental positioning devices of the gyro compass type;

said conditioning means including means for converting said carrier output signals into stepped waveforms representing increment or decrement of direction of rotation of said incremental positioning devices by determining values of equal amplitude for any two phases of said carrier output signal;

means for converting said stepped waveforms into digital coded signals;

a microprocessor adapted to respond to a comparison of values of said digital coded signals generating from said converting means and previous values of said coded signals representing the course of a ship stored in a data register associated with said microprocessor to produce incremental angular output data in digital form; and means in response to said digital data to provide analog X and Y sweep reference signals to rotate the display for orientation purposes.

18. The combination of claim 17 in which said converting means is adapted to convert said stepped waveforms into digital coded signals representing a plurality of steps in either angular direction of said incremental angular output data.

19. In combination:

means for conditioning three phase carrier output signals from incremental positioning devices of the gyro compass type;

said conditioning means including means for converting said carrier output signals into stepped waveforms representing increment or decrement in the direction of rotation of said incremental positioning devices;

means for converting said stepped waveforms into multiphase digital signals;

said means for converting said stepped waveforms into phase digital signals including phase comparator means feeding select decoder means adapted to provide a particular selection signal for application to switch unit means operating in response to said selection signal to select from said stepped waveforms a designated signal of changing amplitude between major transition points which have equal amplitude of any two phases of said three-phase carrier output signals;

comparator means fed by said designated signal to provide by a comparison with previously stored values of coded data representing position a coded signal to a data register having output lines which identify the amplitude of said designated signal with respect to a reference signal; and digital to analog converter means coupled to microprocessor means to feed coded output signals to provide a reference signal which determines when the carrier amplitude of said designated signal is a predetermined amount greater than the amplitude of said reference signal, thereby to provide an incremental output on one of the output lines from said data register, and when said carrier amplitude of said designated signal is lower than the amplitude of said reference signal to produce a decrement output on another of said output lines from said data register to provide precise step changes in orientation of a PPI display by conversion of compass outputs into real-time analog signals without the usual intermediary electromechanical devices.

* * * * *